(12) United States Patent
Smith (10) Patent No.: US 10,274,100 B2
(45) Date of Patent: Apr. 30, 2019

(54) DOUBLE PAIRED WATER KEY

(71) Applicant: Mickel R. Smith, Florissant, MO (US)

(72) Inventor: Mickel R. Smith, Florissant, MO (US)

(*) Notice: Subject to any disclaimer, the term of this patent is extended or adjusted under 35 U.S.C. 154(b) by 416 days.

(21) Appl. No.: 14/966,910

(22) Filed: Dec. 11, 2015

(65) Prior Publication Data
US 2016/0169408 A1    Jun. 16, 2016

Related U.S. Application Data

(60) Provisional application No. 62/090,797, filed on Dec. 11, 2014.

(51) Int. Cl.
*F16K 35/06* (2006.01)

(52) U.S. Cl.
CPC ................... *F16K 35/06* (2013.01)

(58) Field of Classification Search
CPC . B25B 23/0035; B25B 23/0042; B25B 13/06; B25B 13/065; B25B 13/04; B25B 13/48; B25B 13/485; B25B 13/481; B25F 1/02; F16K 35/06; B25G 1/085
USPC ............ 81/125.1, 121.1, 124.4, 124.5, 124.6
See application file for complete search history.

(56) References Cited

U.S. PATENT DOCUMENTS

| | | |
|---|---|---|
| 2,059,085 A | 2/1936 | Buck |
| 3,957,077 A | 5/1976 | Grandjean |
| D318,997 S | 8/1991 | Baker |
| 5,904,080 A * | 5/1999 | Anderson ............... B25F 1/02 81/177.4 |
| 6,269,717 B1 * | 8/2001 | Bollinger ............... B25B 13/06 81/124.4 |
| 7,055,412 B2 | 6/2006 | Leighton |
| 7,117,883 B1 * | 10/2006 | Vitalo ..................... E03B 9/08 137/366 |
| 7,124,999 B1 | 10/2006 | Lai |
| 7,340,984 B2 | 3/2008 | Hsieh |
| D634,596 S | 3/2011 | Munroe |
| 8,752,455 B1 * | 6/2014 | Taylor, Jr. .............. B25B 13/06 81/121.1 |
| 2003/0086756 A1 * | 5/2003 | Trotter ................ B25B 23/0035 403/293 |
| 2009/0151519 A1 * | 6/2009 | Monyem ................ B25B 13/06 81/124.4 |
| 2010/0269263 A1 * | 10/2010 | Burch ................... B25B 15/02 7/108 |

* cited by examiner

*Primary Examiner* — David B. Thomas
(74) *Attorney, Agent, or Firm* — Charles McCloskey (57) ABSTRACT

A double paired water key has a handle with two opposite ends, a shaft extending from one end of the handle, two opposite ends upon the shaft, and at least two concentric openings extending into each end of the shaft where a user may select a pair of openings on the shaft extending from the handle. The openings have various internal shapes, preferably square, and at least two different widths. In each pair of openings, the opening with the least width has its position inwardly from the remaining opening, towards the handle. Each shaft has a tip with at least two sizes of opening. The two ends of the shaft provide four sizes of opening readily selected by a user. Each opening has rounded corners.

6 Claims, 6 Drawing Sheets

DOUBLE PAIRED WATER KEY

CROSS-REFERENCE TO RELATED APPLICATION

This non-provisional application claims priority to provisional application No. 62/090,797 filed on Dec. 11, 2014, all of which are owned by the same inventor.

BACKGROUND OF THE INVENTION

The double paired water key generally relates to hand tools and more specifically to a tool for turning select pairs of valves.

Over the last century, more students have attended more school, generally indoors. Schools have grown and adapted to students and their habits, and curricula and their changes. Schools through the years though still retain restrooms, usually for each gender. The restrooms have common plumbing fixtures such as toilets, sinks, and hose bibs. In schools for upper grades, locker rooms have shower facilities. The shower facilities have common plumbing fixtures such as shower heads, hose bibs, and whirlpool connections. In commercial, institutional, and industrial settings, connections for hoses have bibs installed in a wall but do not have a handle. At great intervals of time, a fixture fails. At shorter intervals of time, persons unknown tinker with fixtures. Failed fixtures and tinkered fixtures often lead to spillage of water. Along with failures and tinkering, ordinary repairs and preventive maintenance also call for adjusting the fixtures. The fixtures generally have various valves for operation of the fixture and control of the water supply to the fixture. Some valves perform both functions and some fixtures have separate operational valves and supply valves.

The various valves near fixtures operate using keys instead of handles. Usage of keys allows the school districts to restrict access to the valves to select persons as opposed to any person who can turn a handle. Valve keys come in various shapes and sizes including recessed and embossed, square, pentagonal, hexagonal, duodectagonal, and the like. The valves call for a particular shape to operate them. School districts, and other valve users, have appointed maintenance staff to keep the valve keys for their facilities. A maintenance staffer may accumulate a collection of valve keys as the number and type of valves in a facility grow. The valve key collection may become heavy and cumbersome to index.

DESCRIPTION OF THE PRIOR ART

As mentioned valve keys come in various shapes and sizes. However, a person usually has to turn the valve key. Existing valve keys come with a handle opposite the key itself. The handle allows for manual turning of the valve key once the maintenance staffer matches it to a valve. Valves though have a tendency to grow sticky in position over the years. Select valve keys allow for turning by a wrench applied to the key. A staffer may apply the wrench to the handle or the shaft between the handle and the valve key. Typically, a handle turns one valve key.

A maintenance staffer may accumulate a variety of valve keys, some with handles, some not. The accumulation of keys calls for learning by the staffer and perhaps indexing by a labeling system. Skilled staffers learn their valve keys through usage over the years. But even skilled staffers find the handles of valve keys accumulate and make storage of many valve keys troublesome. Further, when water is running all over the floor, staffers may still have to search for a key under more urgent circumstances.

The patent to Leighton, U.S. Pat. No. 7,055,412 describes a universal gas valve key. The abstract on the first page notes this key's parts as a handle, a shaft, and a socket with cascaded receiving cavities. Leighton describes two forms of her invention: unitary and components. The unitary form has a die cast handle and shaft with a machined socket, col. 5 lines 2-10. The component form has a separate handle, joined to a shaft, a shaft joined to a socket, and the socket with cascaded cavities, c. 6 l. 2-5. The component form may have additional nested cavities, c. 6 l. 53. Leighton's use of a handle prevents having nested cavities on both ends of a socket.

The patent to Hsieh, U.S. Pat. No. 7,340,984 provides a multi functional hand tool. This patent shows a tool with a handle and two sockets, one on each end of the handle. The sockets have a diameter generally larger than the width of the handle, see FIGS. 1, 2, 3. The sockets may have various shapes to their apertures as shown in FIG. 4. FIG. 11 shows the handle has a pivot in it.

The patent to Grandjean, U.S. Pat. No. 3,957,077 describes a valve and its operating means. The operating means includes a key with a round handle. The key 24 fits into a valve with a square stem 18. The key has a square bore 27 as shown in FIGS. 3, 4. The key also has threading to engage the internal threading 22 of the valve.

The patent to Buck, U.S. Pat. No. 2,059,085 provides a valve guard that prevents unauthorized access to valve stems. The guard has disk with a shaped hole and fingers hanging beneath the disk. An authorized worker inserts a key of a certain shape to lift the guard from the valve stem and then he accesses the valve. This key has a shaft 16 with a ring handle upon one end, a tip on the other end 17 and two curving elements 18 near the tip.

The patent to Baker, No. D318,997 illustrates a socket tool. Here, the socket has two ends upon a slender tapering shaft. One end has a square bore while one end has knurling and the other end has a hollow hex head. FIGS. 5, 6 show the end views of the socket.

The patent to Munroe, No. D634,596, also illustrates a double female socket extension. This extension appears symmetric and both ends have a square opening. The shaft tapers inwardly from the square openings and then has a constant diameter.

And, the patent to Lai, U.S. Pat. No. 7,124,999 describes a switch valve with a locking effect. This valve shows a key 43 with a handle and a socket opposite the handle. The socket has a square mounting hole 42 as shown in FIG. 2. The rotation head 40 rests upon the valve body 20 but does not pass between the valve body and the limit ring 30 in FIG. 4.

The present invention overcomes the disadvantages of the prior art and provides a double paired water key. The invention allows for two keys placed upon one handle while allowing a user to choose between the keys for application to a particular valve. The invention saves space in storage of the valve keys and provides ready access to a pair of keys during an urgent situation.

SUMMARY OF THE INVENTION

Generally, the double paired water key has a handle with two opposite ends, a shaft extending from one end, and at least two concentric sockets extending from the shaft opposite the handle. The sockets have various internal shapes and at least two different widths. The socket with the least width has its position inwardly from the remaining sockets, that is, towards the handle. In an alternate embodiment, the invention has a handle with two opposite ends, a first shaft extending from one end and a second shaft extending from the other end, a first socket extending from the first shaft, and a second socket extending from the second shaft.

There has thus been outlined, rather broadly, the more important features of the invention in order that the detailed description thereof that follows may be better understood and that the present contribution to the art may be better appreciated. The present invention also includes ribbing and knurling upon the handle, nesting of sockets, sockets cast or forged with the shafts, and a larger socket having a weight to identify it, and the like. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a double paired water key that provides four keys in the volume of one key.

Another object is to provide such a double paired water key that has a compact form.

Another object is to provide such a double paired water key that readily shifts from one key to another key.

Another object is to provide such a double paired water key that is capable of manufacturer and distribution at a price suitable for the end customers, supply houses, retailers, and catalogs to provide.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

The present art overcomes the prior art limitations by providing a double paired water key. Such a key appears as the present invention 1 in FIG. 1. A fitting, as at V, has its inlet connected to a water supply line, not shown, and an opposite outlet, or spout. Before the outlet, the fitting has its stem, as at S, that rotates to open and to close the fitting to passage of water there through. The stem has a select shape typically different from a regular or Phillips screw driver. The stem fits within a rim R generally outwardly from the remainder of the fitting as shown. Here the stem has a square shape shown though other shapes occur pursuant to manufacture instructions or orders from a customer, such as a school district. The stem fits a key for its turning by an authorized person such as custodian, superintendent, a maintenance man, and the like. An authorized person actuates the fitting using the key.

Figure 1:
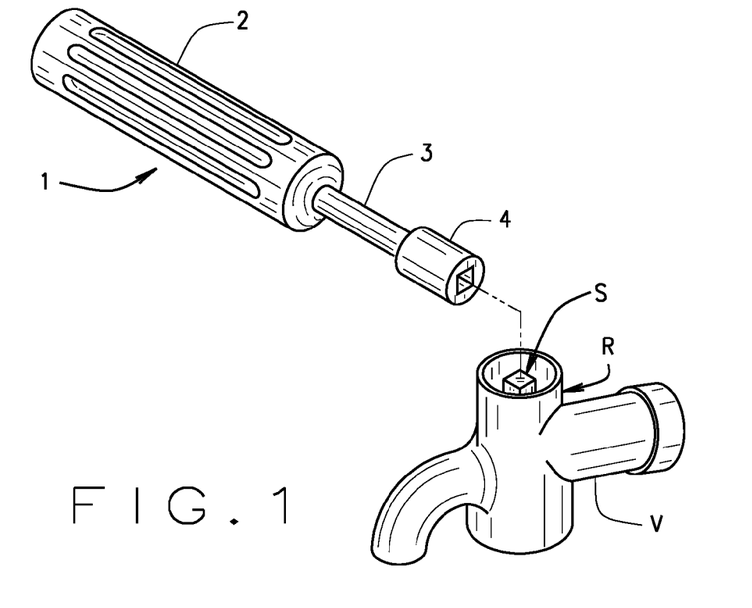
FIG. 1 is a perspective view of an alternate embodiment of the invention.

The invention 1 has a handle 2 suitable for gripping by a person and a shaft 3 extending from the handle. The shaft is generally round and coaxial with the handle and of lesser diameter than the handle. The shaft is typically metal while the handle may be of various materials. The shaft has its length suitable for inserting within the rim R of a fitting V, or alternatively an outer wall of the fitting, for prevention of knuckle injuries to the person using the invention, and for resisting bending and twisting during use thus the shaft has a length less than that of the handle, as shown. Opposite from the handle, the shaft has a socket 4 extending coaxial from the shaft. The socket has a generally round shape and a diameter exceeding that of the shaft. And opposite the shaft, the socket has a working end 5 that a person inserts within the rim R and upon the stem S, much like a key into a lock.

Figure 2:
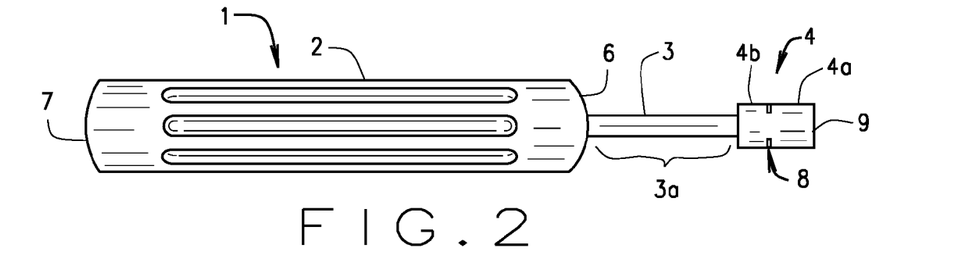
FIG. 2 is a side view of an alternate embodiment of the invention.

FIG. 2 describes the invention 1 from the side. The handle has two opposite ends, a fore end 6 and an aft end 7. The fore end joins to the shaft while the aft end abuts a person's palm during usage. The handle includes fluting or knurling to improve the grip of a person using the invention. The handle has a generally round cylindrical form of a diameter suitable for gripping by a person's hand. The fore end 6 receives and fixes the shaft 3 to the handle. The shaft is generally centered upon the fore end and extends coaxially from the handle. The shaft is also cylindrical in shape though of lesser diameter than the handle. The shaft has its length, 3a, generally less than that of the handle. Opposite the fore end 3, the shaft merges into the socket 4 so that the socket is coaxial with the shaft and generally centered upon the fore end. The socket has two portions: a first portion as at 4a, and a second portion as at 4b. A notation 8 separates the two portions and guides the user to select a portion suitable for the stem S at hand. Then opposite the aft end 7, the invention has a working end 9 upon the socket. The working end is generally round and of the same diameter as the socket. The working end inserts into the rim R during usage and has an opening, not shown, that admits the stem S into the socket.

Figure 3:
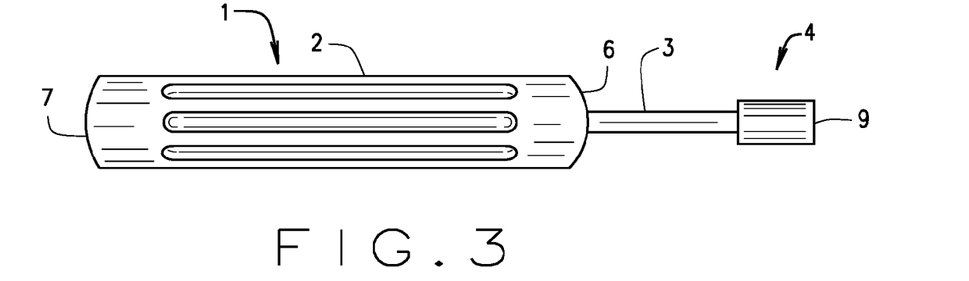
FIG. 3 is another side view of an alternate embodiment of the invention.

FIG. 3 then shows another side view. As the handle has symmetry, two side views show the invention. In this embodiment, the notation 8 is not shown in this figure to assist the user to identify a flat edge within the opening of the working end. Doing so guides the user to place the socket property upon the stem S.

Figure 4:
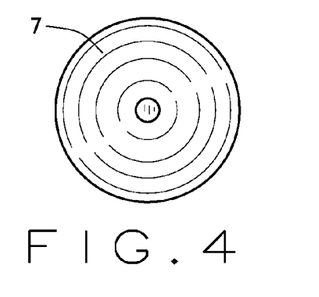
FIG. 4 is a back view of an alternate embodiment of the invention.

FIG. 4 shows a back view of the invention with the aft end 7 in the foreground. A user would see this view when gripping the handle 2 and a user would feel the aft end 7 as it rests in the palm of the user's hand. The aft end is generally round of the same diameter as the remainder of the handle. The aft end is generally rounded into a hemispherical shape for the comfort of the user.

Figure 5:
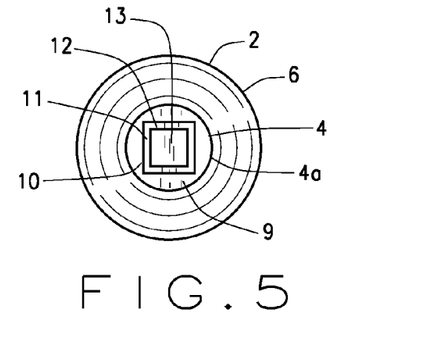
FIG. 5 is a front view of an alternate embodiment of the invention.

Turning to FIG. 5, the working end 9 appears in center of the foreground with the fore end 6 in the background. The working end has the socket 4 behind it with the first portion 4a here shown. The working end has a first opening 10, here shown as square though other shapes are foreseen, that opens to a first chamber 11. The first chamber extends inwardly through the first portion 4a to a second opening 12, here shown as square though other shapes are foreseen. The second opening has a lesser width than the first opening and a recessed inwardly position from the working end. The second opening then opens to a second chamber 13. The first chamber and the second chamber are coaxial with the socket and the shaft.

Figure 6:
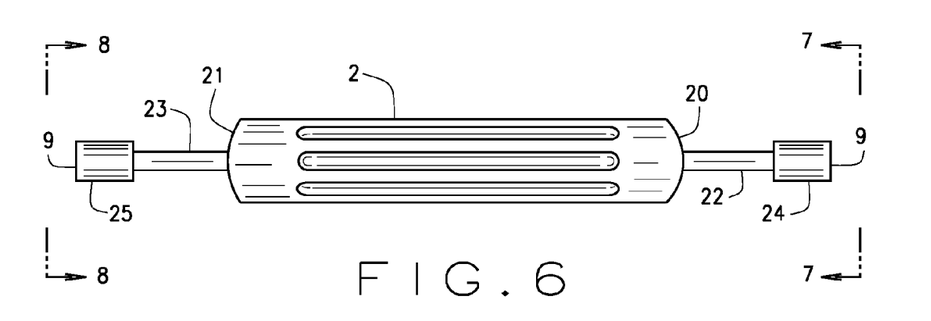
FIG. 6 is a side view of an alternate embodiment of the invention.

FIG. 6 shows an alternate embodiment of the invention. This embodiment has a handle 2 with two opposed working ends 9. The handle has a generally cylindrical form with a round shape having a diameter comfortable to the user. The handle may include fluting, knurling, surface texture, and the like to promote a firm grip by a user. The handle has a first end 20 and a spaced apart opposite second end 21. Coaxial with the handle, a first shaft 22 extends from the first end opposite the handle. The first shaft 22 is a cylindrical form of lesser diameter than the handle and of a length to offset a user's knuckles from a fitting V during usage. Typically, the first shaft has a length slightly less than that of the handle. Opposite the handle, the first shaft has a first socket 24 coaxial with the first shaft and opposite the first end. The first shaft has one of the working ends 9 in this embodiment.

Opposite the first shaft 22 and the first end 20, a second shaft 23 extends from the second end 21 outwardly from the handle. The second shaft 23 also has a cylindrical form of lesser diameter than the handle and of a length to spare a user's knuckles from wrapping on a fitting. Typically, the second shaft has a length slightly less than that of the handle. In this alternate embodiment, the second shaft has the same length as the first shaft. In a further alternate embodiment, the second shaft has a different length than the first shaft where the length difference assists a user in selecting the proper end of the tool for usage. Opposite the handle, the second shaft has its second socket 25 coaxial with the second shaft and opposite the second end. In this alternate embodiment, the second shaft has a coaxial orientation with the handle and the first shaft. In a further alternate embodiment, the second shaft has an offset orientation from the axis of the first shaft so that a user may apply additional rotational torque. The second shaft has the other of the working ends 9 in this embodiment.

Figure 7:
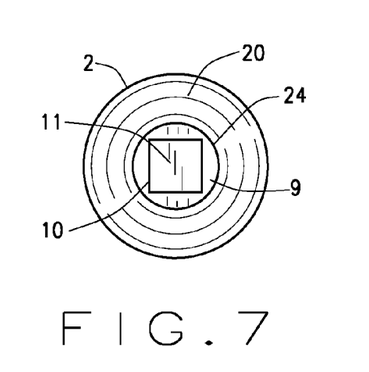
FIG. 7 is an end view of the alternate embodiment.

FIG. 7 then provides an end view of the first socket 24 with the working end 9 in the foreground. Inwardly from the working end, the first socket 24 has an opening 10, here shown as square, though other shapes are foreseen. The opening leads to a first chamber 11 generally centered upon the working end and extending inwardly towards the first shaft. The first chamber though stops short of reaching the first shaft. Outwardly from the first socket, a portion of the first end 20 appears in this figure as the first socket has a lesser diameter than the first end.

Figure 8:
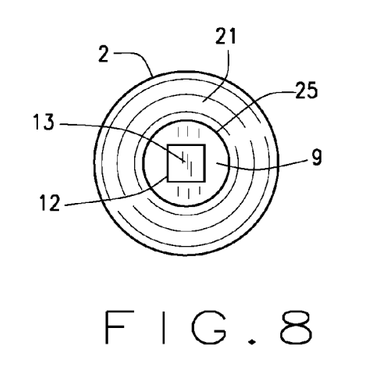
FIG. 8 is an end view opposite that of FIG. 7.

FIG. 8 shows an end view opposite that of FIG. 7. This figure shows an end view of the second socket 25 and has the working end 9 in the foreground. Inwardly from the working end, that is, towards the handle 2, the second socket 25 has a second opening 12, here shown as square, though other shapes are foreseen. A second chamber 13 extends inwardly from the second opening and towards the second shaft. Similar to the first chamber, the second chamber is generally centered upon the second socket and coaxial with the second shaft. The second chamber though does not open to the second shaft. A portion of the second end 21 appears in this figure outwardly from the second socket because it has a greater diameter than the second socket.

Figure 9:
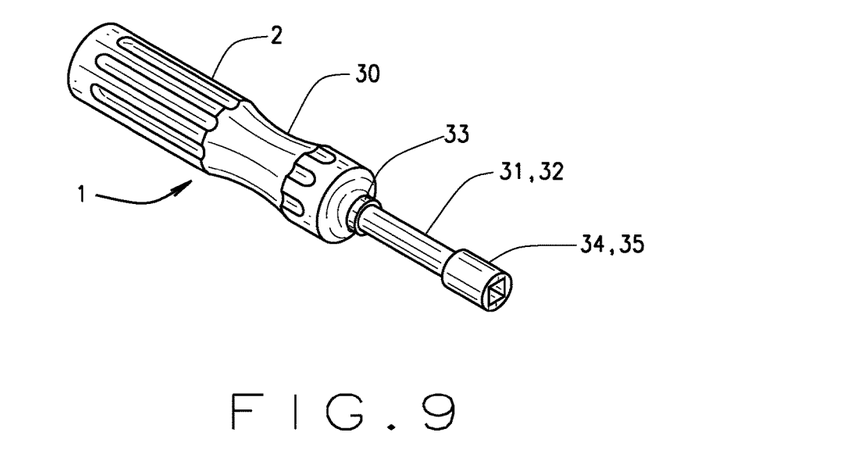
FIG. 9 is a perspective view of an alternate embodiment of the invention.

FIG. 9 provides an isometric view of a further alternate embodiment of the invention 1. The invention has its cylindrical handle 2 with a surface suitable for grasping by a user. The handle includes a concave portion, or grip 30, that has a narrower diameter than the remainder of the handle. The grip has a length less than that of the handle as shown and widens back to the diameter of the handle at the fore end 6. The fore end 6 receives a knuckle 33 inserted into it along the longitudinal axis of the handle. The knuckle has its diameter and a generally cylindrical shape as later shown. Outwardly from the knuckle, this embodiment has either a first shaft 31 and a second shaft 32. Opposite the knuckle, the first shaft has a first tip 34 and the second shaft has a second tip 35. In this embodiment, either the first shaft or the second shaft extends outwardly from the knuckle while the other of the two shafts fits within the handle.

Figure 10:
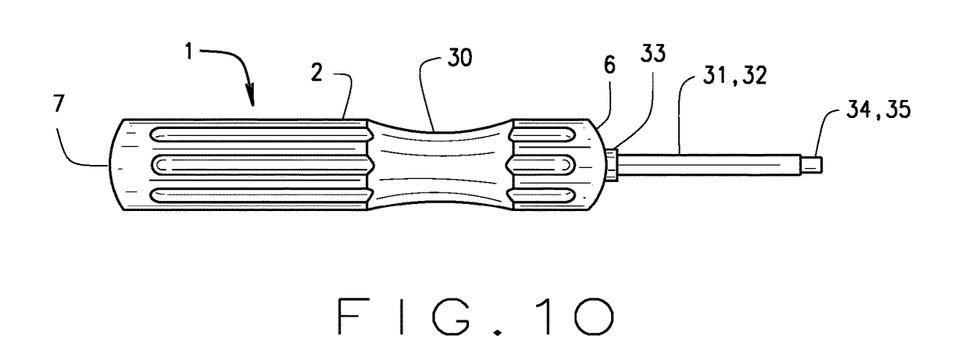
FIG. 10 is a side view of the alternate embodiment of the invention.

Turning the invention to the side as shown in FIG. 10, the handle 2 has its aft end 7 and opposite fore end 6 with the grip 30 locating closer towards the fore end 6 than the aft end 7. The fore end includes an opening that receives the knuckle 33. The knuckle has joined to it a first shaft 31 and a second shaft 32 with one of the shafts shown and the other shaft contained within the handle.

Figure 11:
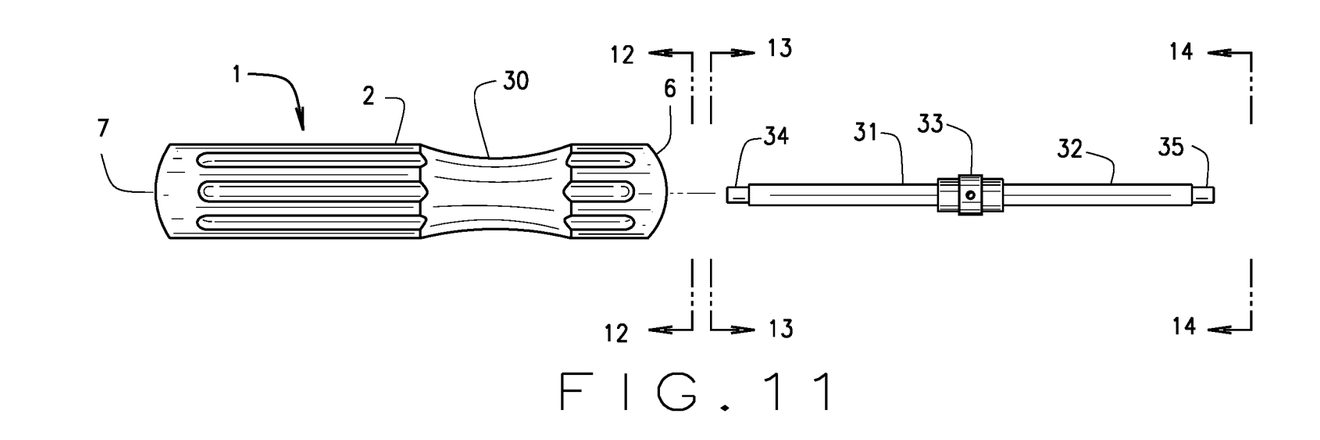
FIG. 11 is an exploded view of the alternate embodiment of the invention.

FIG. 11 provides an exploded view of this alternate embodiment of the invention with the handle 2 towards the left and the combined shafts towards the right. The handle has its cylindrical form with aft end 7 and opposite fore end 6 as previously described. Near the fore end 6, the handle has its grip 30 that provides a concavity suitable for the fingers of a user when grasping the handle. Outwardly from the handle, this embodiment has coaxial first shaft 31 and second shaft 32 joined by the knuckle 33. The first shaft and the second shaft have a generally elongated cylindrical form and lengths that exceed their diameters. The knuckle merges the first shaft with the second shaft while keeping them coaxial. The knuckle has a generally cylindrical form with a diameter greater than either shaft and a length more than its diameter but the length is less than that of either shaft. Generally centered upon the knuckle, at least one bearing extends outwardly from the knuckle and engages the fore end 6.

The first shaft has its first tip 34 coaxial with the first shaft and opposite the knuckle 33. The first tip has a slightly less diameter than the remainder of the first shaft. On the opposite end of the knuckle, the second shaft also has its second tip 35. The second shaft then has a greater diameter than the diameter of the second tip. As shown in FIG. 11, the knuckle has the two shafts mutually coaxial and outwardly from the knuckle. This embodiment allows a user to select from two tips and then insert the unused tip and related shaft into the handle for storage while the used tip is applied by the user to a valve or other device.

Figure 12:
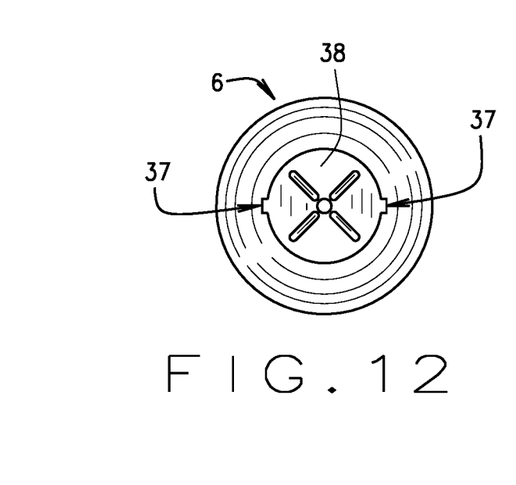
FIG. 12 is an end view of the handle of the alternate embodiment of the invention.

The unused shaft and portion of the knuckle fit into the fore end 6 as shown in FIG. 12. This figure shows the fore end in the foreground with the remainder of the handle into the plane of the figure. The fore end opens into a chamber 38 that has a depth and diameter to receive either the first shaft or the second shaft. At the fore end, the chamber has at least one, here showing two, pockets 37 with a depth that increases the diameter of the chamber solely at those pockets. The depth of each pocket is slightly less than one half the diameter of the bearing 36. In use, a user selects the shaft and tip for use, then inserts the opposite shaft into the chamber 38 and the knuckle partially into the chamber. The knuckle inserts so that the bearing engages pocket. The bearing prevents the shafts from slipping out of the handle under their own weight and other light forces. The shafts do slip from the chamber upon a strong tug by the user.

Figure 13:
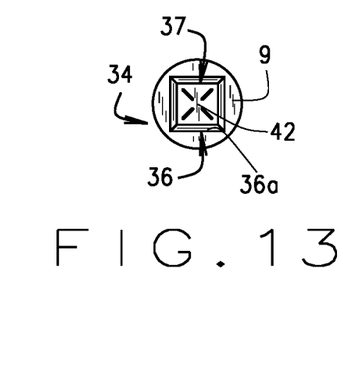
FIG. 13 is an end view of one tip and FIG. 14 is an end view of the opposite tip.

As mentioned above, the user selects a tip 34, 35 for a desired use. The two tips include the ability to turn four sizes of valve that a user encounters. FIG. 13 shows an end view of the first tip 34. The first tip has its working face 9 which has a first opening as at 36 generally shown as square. The first opening leads into a first chamber 36a of a rectangular space. The first opening descends into the first tip and then steps inwardly in width to a second opening as at 37. The second opening further descends into the first tip as a second chamber 42 of a rectangular space though narrower than the first chamber. The first opening and the second opening have a generally square shape and the first opening has a side length greater than the side length of the second opening.

Figure 14:
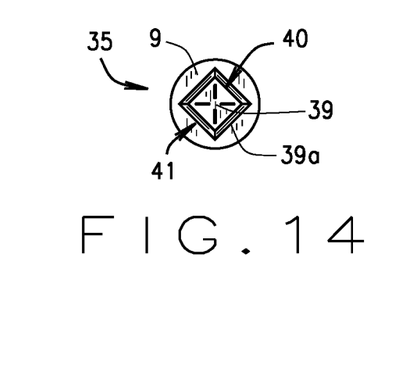

Turning to the second shaft, FIG. 14 shows an end view with the second tip 35 in the foreground. The second tip also has a working surface 9 which has a third opening as at 39 also shown as square. The third opening leads into a third chamber 39a of a rectangular space, typically narrower than the second opening. The third opening descends into the second tip and then steps inwardly in width to a fourth opening as at 40. The fourth opening further descends into the second tip as a fourth chamber 41 of a rectangular space though narrower than the third chamber. The third opening and the fourth opening have a generally square shape and the third opening has a side length greater than the side length of the fourth opening. The side length of the second opening also exceeds the side length of the third opening. As described in FIGS. 13, 14, the two tips provide four sizes of opening upon the two shafts extending from a common knuckle. A user may rapidly select from the four sizes as the user rotates the shafts upon an axis through the knuckle and perpendicular to the longitudinal axis of the shafts. Effectively a user may spin the shafts and select the opening of choice for the application before the user.

Figures 15A, 15B:
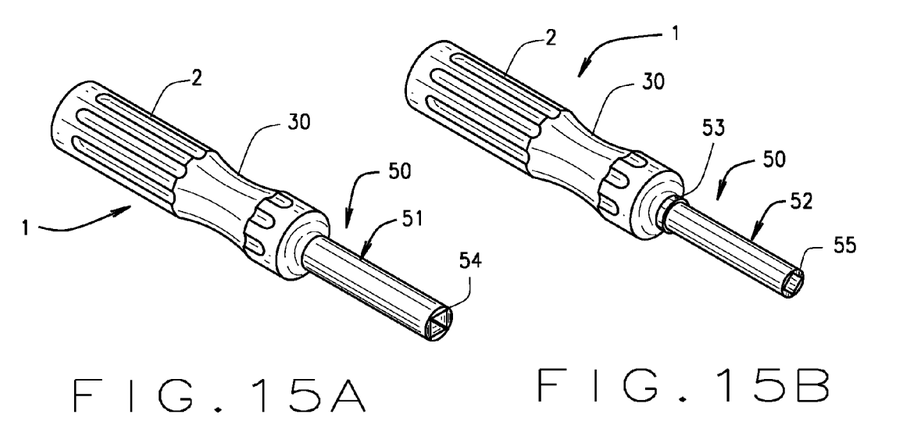
FIG. 15a is a perspective view of the preferred embodiment of the invention and FIG. 15b is a perspective view of the shaft reversed.

FIG. 15a provides an isometric view of the preferred embodiment of the invention 1. This embodiment has its cylindrical handle 2 as before with a concave portion, or grip 30. The grip has its length less than that of the handle and widens back to the diameter of the handle at the fore end 6, that is, away from a user. The fore end receives a shaft 50 into its chamber 38 as previously described. The shaft has two portions: a first portion 51 and a second portion 52. The first portion and the second portion are coaxial, cylindrical, elongated, and come from a single piece of material, typically steel. In this figure, the first portion 51 appears shown extending outwardly from the fore end 6 with its first tip 54 opposite the fore end. The first portion has its diameter and its length, preferably the length is at least three times that of the diameter.

The preferred embodiment includes the shaft 50 with its first portion 51 and second portion 52. A user may select either portion for insertion into the handle 2. FIG. 15b shows the first portion inserted into chamber 38 and the second portion 52 exposed. The second portion has a slightly larger diameter than that of the first portion. The shaft 50 transitions its diameter from that of the second portion to that of the first portion at a knuckle 53. The fore end 6 receives the knuckle 53 inserted into it along the longitudinal axis of the handle. A portion of the knuckle remains exposed as shown. The knuckle steps down the diameter of the shaft from the second to the first portion. Outwardly from the knuckle, the shaft has the second portion 52 shown. The second portion also has its diameter and its length. The second portion 52 has its second tip 55 shown oriented outwardly from the handle and a user. Generally, the second portion has a shorter length and narrower diameter than that of the first portion. The length of the second portion is preferably at least three times that of the diameter.

Figure 16A:
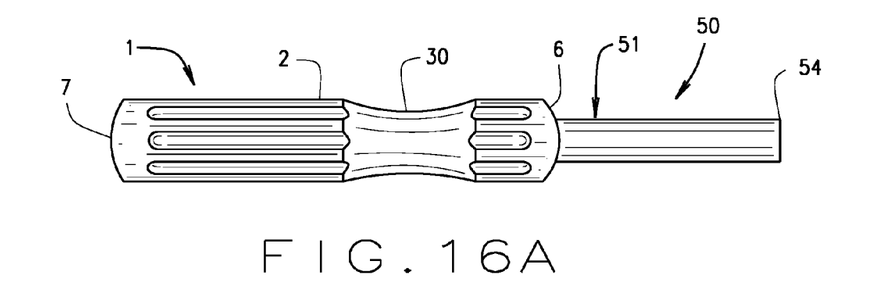
FIG. 16a is a side view of the preferred embodiment of the invention and FIG. 16b is a side view of the shaft reversed.

Turning the invention to the side as shown in FIG. 16a, the handle 2 has its aft end 7 to the left and opposite fore end 6 outwardly from the grip 30, that is, towards the right. The fore end includes an opening, or chamber 38, that admits either the first portion 51 or the second portion 52 of the shaft 50. In this figure, the chamber receives the second portion 52 and exposes the first portion 51. The first portion 51 has its tip 54 towards the right in this figure. In this configuration, the knuckle fits into the chamber and does not appear visible. The invention provides a user with at least four sizes of openings to connect with a valve or its stem.

Figure 16B:
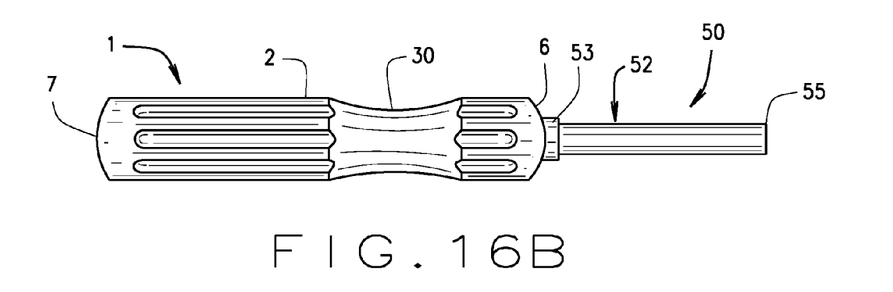

A user may reverse the shaft 50 to access the other half of the openings from that shown in FIG. 16a. FIG. 16b shows the handle 2 with its aft end 7 and fore end 6 as above. The fore end includes the chamber 38 that receives the first portion 51 and exposes the second portion 52 and a portion of the knuckle 53 that appears visible. Outwardly from the knuckle, the second portion 52 has its tip 55 towards the right in this FIG. 16b.

Figure 17:
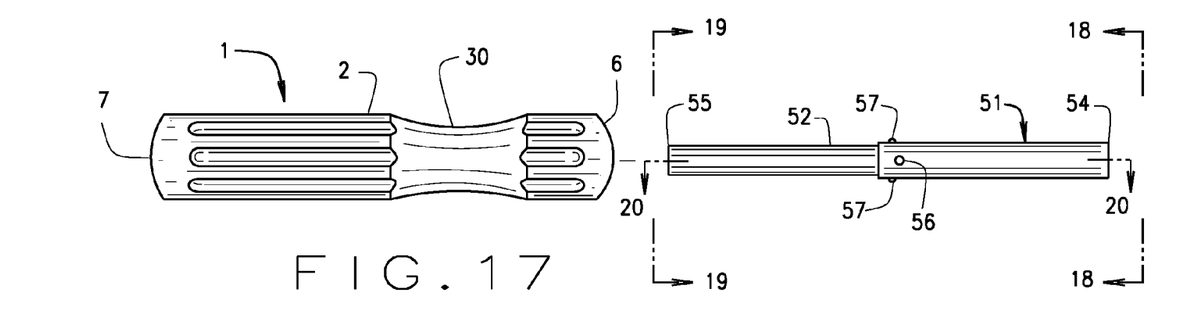
FIG. 17 is an exploded view of the preferred embodiment of the invention.

FIG. 17 provides an exploded view of this preferred embodiment of the invention with the handle 2 towards the left and the shaft 50 towards the right with its second portion 52 shown towards the handle and its first portion shown to the right. The cylindrical handle has its aft end 7 and opposite fore end 6 as before. Also, the handle has its grip 30 with a concavity for the comfort of a user's fingers when grasping the handle. Outwardly from the handle, this embodiment has its shaft 50 with the coaxial second portion 52 stepping in diameter to the first portion 51 at the knuckle 53. The second portion and the first portion each have a generally elongated cylindrical form and lengths that exceed their diameters. The second portion has a lesser diameter and a lesser length than the first portion. The knuckle transitions the diameter of the first portion to that of the second portion while keeping them coaxial. The knuckle has a generally cylindrical form and represents the inner terminus of the first portion. The knuckle 53 includes a detent 56, typically a biased ball bearing, and at least two minor detents 57 generally diametrically positioned upon the knuckle. The detent 56 appears upon the knuckle towards the first portion and generally centered between the two minor detents 57. The minor detents, typically fixed ball bearings, cooperate with slots in the fore end 6. The detent and minor detents cooperate in this figure so that the second portion 52 inserts fully into the handle and exposes the entire first portion 51. The minor detents fit into slots within the handle as previously shown in FIG. 16*a*. The detent fits into a recess machine into the handle. The detent in cooperation with the recess prevents the handle from rotating axially upon the shaft during usage, and thus the user has a firm grip of the invention upon a valve stem.

The first portion 51 has its first tip 54 coaxial with the remainder of the shaft 50, outwardly from the knuckle 53, and shown away and opposite the handle in FIG. 17. The first tip has the same diameter as the remainder of the first portion. On the opposite end of the knuckle, the second portion has its second tip 55 also coaxial with the remainder of the shaft 50, and shown towards the handle in FIG. 17. The second portion then has a lesser diameter than the diameter of the first portion. As previously shown in FIGS. 16*a*, 16*b*, the knuckle transitions from the first portion to the second portion of the shaft so that the two portions are mutually coaxial and separated by the knuckle. This embodiment allows a user to select from two tips and then insert the unused tip and related portion into the handle for storage while the used tip is applied by the user to a valve or other device. The unused portion fit into the fore end 6 as previously shown in FIGS. 12, 16*a*, 16*b*.

Figure 18:
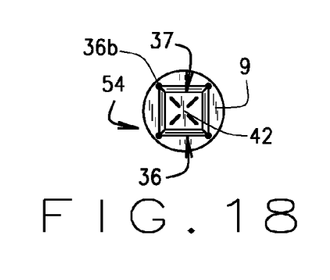
FIG. 18 is an end view of the first tip of the preferred embodiment of the invention and FIG. 19 is an end view of the opposite second tip; and, FIG. 20 is a sectional view lengthwise through the shaft.

FIG. 18 shows the first tip 54 in an end view, typically before a user places the tip upon a valve stem for turning. The first tip has the ability to turn at least two sizes of valve that a user encounters. The first tip has its working face 9 as before with the first opening as at 36 generally shown as square. Being of square shape the first opening has four sides as shown where each pair of sides is mutually parallel and spaced apart. Then the two pairs of sides are perpendicular. The sides generally have the same width defining the width of the first opening. Where two sides approach at a common corner, the sides do not intersect but rather have a rounded hole as at 36*b* extending into the interior of the first portion of the shaft. Each of the four corners has a rounded hole where the hole is drilled, machined, cast, or otherwise made to the corners of the first opening. The rounded holes extend radially outwardly from the sides of the first opening.

The first opening allows access into the interior of the first portion. More particularly, the first opening leads into a first chamber 36*a* of a rectangular space. As later shown, the first chamber has its length inwardly into the first portion. The first opening descends into the first tip and then steps inwardly in width to a second opening as at 37. Being of square shape the second opening also has four sides as shown where each pair of sides is mutually parallel and spaced apart. Then the two pairs of sides are perpendicular. The sides generally have the same width defining the width of the second opening. The first opening and the second opening have a generally square shape and the first opening has a side length greater than the side length of the second opening.

The second opening further descends into the first tip as a second chamber 42 of a rectangular space though narrower than the first chamber. The second opening allows further access into the interior of the first portion. More particularly, the second opening leads into the second chamber 42 that has its width slightly less than that of the first chamber. As later shown, the second chamber has its length inwardly into the first portion and a position recessed inwardly from the first chamber. The rounded holes 36*b* at the corners extend from the first opening, into the first chamber, into the second opening, and into the second chamber. The rounded holes accommodate older or worn keys, or valve stems, that have their own corners deformed from usage, corrosion, and the like. The first opening, the first chamber, the second opening, and the second chamber mutually orient in registration and generally appear coaxial on the first portion of the shaft.

Figure 19:
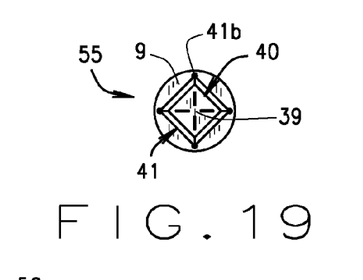

Turning the shaft with the second portion forward, FIG. 19 shows an end view with the second tip 55 in the foreground. The second tip also has a working surface 9 which has a third opening as at 39 also shown as square. Being of square shape the third opening has four sides as shown where each pair of sides is mutually parallel and spaced apart. Then the two pairs of sides are perpendicular. The sides generally have the same defining the width of the third opening. Where two sides approach at a common corner, the sides do not intersect but rather have a rounded hole as at 41*b*. Each of the four corners has a rounded hole where the hole is drilled, machined, cast, or otherwise made to the corners of the first opening. The third opening and subsequent related features also have a rotation clockwise compared to the first opening of FIG. 18. The third opening has a rotation of about twenty two to about forty five degrees clockwise from the first opening. The rotation of the third opening reminds the user of his selection of the openings on the other portion of the shaft.

The third opening leads into a third chamber 39*a* of a rectangular space, typically narrower than the second opening. The third opening allows further access into the interior of the second portion. More particularly, the third opening descends into the second tip and then steps inwardly in width to a fourth opening as at 40. Being of square shape the fourth opening also has four sides as shown where each pair of sides is mutually parallel and spaced apart. Then the two pairs of sides are perpendicular. The sides generally have the same defining the width of the fourth opening. The third opening and the fourth opening have a generally square shape and the third opening has a side length greater than the side length of the fourth opening. The third opening though has a lesser side length than the second opening of FIG. 18.

The fourth opening further descends into the fourth chamber 41 of a rectangular space though narrower than the third chamber. The fourth opening allows further access into the interior of the second portion. More particularly, the fourth opening further descends into the second tip as a fourth chamber 41 of a rectangular space though narrower than the third chamber. As later shown, the fourth chamber has its length inwardly into the second portion and a position recessed inwardly from the third chamber. The rounded holes 41*b* at the corners extend from the third opening, into the third chamber, into the fourth opening, and into the fourth chamber. The rounded holes extend into the interior of the second portion of the shaft. Each of the four corners has a rounded hole where the hole is drilled, machined, cast, or otherwise made to the corners of the third opening. The rounded holes extend radially outwardly from the sides of the third opening. The rounded holes accommodate older or worn keys, or valve stems, that have their own corners deformed from usage, corrosion, and the like. The third opening and the fourth opening have a generally square shape and the third opening has a side length greater than the side length of the fourth opening. The side length of the second opening also exceeds the side length of the third opening. The third opening, the third chamber, the fourth opening, and the fourth chamber mutually orient in registration and generally appear coaxial on the second portion of the shaft.

As described in FIGS. 18, 19, the two tips provide four sizes of opening upon the two ends of the shaft and its first portion and second portion with a knuckle between the two portions. A user may rapidly select from the four sizes as the user rotates the shaft upon an axis through the knuckle and perpendicular to the longitudinal axis of the shaft. Effectively a user may flip the shaft and select the opening of choice for the stuck valve before the user.

Figure 20:
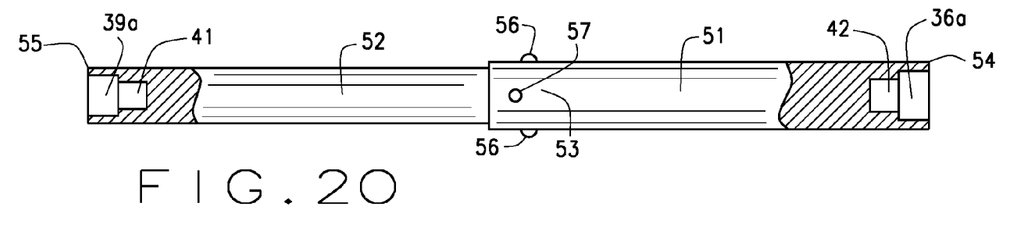

And, FIG. 20 provides a sectional view lengthwise through the shaft 50. From the top of this figure, the shaft has its second tip 55 that opens into the third chamber 39a of a width and a length inwardly into the shaft. The third chamber then opens into the fourth chamber 41 with a narrower width than the third chamber and its length into the shaft. The third chamber and the fourth chamber appear coaxial and cascading. Inwardly from the fourth chamber, the second tip merges with the remainder of the second portion 52 of the shaft. The second portion has its diameter that continues at a constant value from the second tip 55 to the knuckle 53.

The knuckle shows a step outwardly in diameter to the first portion 51. The knuckle transitions the diameter quickly from the second portion to the wider first portion. The knuckle also includes the at least two minor detents shown oppositely here. The second portion also has its diameter than continues at a constant value for the length of the second portion from the knuckle 53 down to the first tip 54. Towards the bottom of this figure, the shaft has its first tip 54 that opens into the first chamber 36a of a width and a length inwardly into the shaft. The first chamber then opens into the second chamber 42 with a narrower width than the first chamber and its length into the shaft. The first chamber and the second chamber appear coaxial and cascading. The first chamber is wider than the third chamber previously described. Outwardly from the second chamber and the first chamber, the first portion 51 of the shaft 50 terminates with the first tip 54.

From the aforementioned description, a double paired water key has been described. The double paired water key, as a device, is uniquely capable of providing four sizes of key in the volume of one key. The double paired water key and its various components may be may be manufactured from many materials, including but not limited to, steel, aluminum, polymers, ferrous and non-ferrous metals, their alloys, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:
1. A device for actuating a valve key, comprising:
   a shaft, said shaft having a first portion and a second portion, said second portion being coaxial with said first portion;
   said first portion being cylindrical and elongated, having a diameter, a length and first tip;
   said first tip having a first opening allowing access inwardly of said first tip interiorly into said first portion, said first opening having a width and a square shape of four sides leading to a first chamber;
   said first chamber having a length and a second opening inwardly from said first opening, said second opening having a square shape of four sides leading to a second chamber and a width less than that of said first opening, said second chamber being recessed inwardly from said first chamber;
   said first opening, said first chamber, said second opening, and said second chamber being coaxial upon said first portion;
   said second portion being cylindrical and elongated, having a diameter less than that of said first portion, a length less than that of said first portion, and a second tip;
   said second tip having a third opening allowing access inwardly of said second tip interiorly into said second portion, said third opening having a width and a square shape of four sides leading to a third chamber, said third opening having a lesser width than said second opening;

said third chamber having a length and a fourth opening inwardly from said third opening, said fourth opening having a square shape of four sides leading to a fourth chamber and a width less than that of said third opening, said fourth chamber being recessed inwardly from said third chamber;

said third opening, said third chamber, said fourth opening, and said fourth chamber being coaxial upon said second portion;

said first opening, said first chamber, said second opening, and said second chamber being in mutual registration, and, said third opening, said third chamber, said fourth opening, and said fourth chamber being in mutual registration.

2. The device for actuating valve key of claim 1 further comprising:

a handle having a first end and an opposite second end, one of said first portion and said second portion connecting to said first end;

said first end of said handle having an opening therein and extending into said handle, said opening having at least one pocket;

one of said first portion of said shaft and said second portion of said shaft inserting into said opening of said first end and said knuckle inserting into said opening of said first end;

said knuckle including at least one detent and at least two minor detents, said at least one detent engaging said at least one pocket for securement of said knuckle to said handle; and, wherein said first portion and said second portion remain coaxial regardless of which inserts into said chamber.

3. A valve key comprising:

a first portion and a second portion, said second portion being coaxial with said first portion, said first portion and said second portion forming a shaft;

said first portion having an elongated, cylindrical, round form with a diameter, a length and first tip;

said first tip having a first opening allowing access inwardly of said first tip interiorly into said first portion, said first opening having a width and a square shape of four sides leading to a first chamber;

said first chamber having a length and a second opening inwardly from said first opening, said second opening having a square shape of four sides leading to a second chamber and a width less than that of said first opening, said second chamber being recessed inwardly from said first chamber;

said first opening, said first chamber, said second opening, and said second chamber being coaxial upon said first portion;

said second portion having an elongated, cylindrical, round form with a diameter less than that of said first portion, a length less than that of said first portion, and a second tip;

said second tip having a third opening allowing access inwardly of said second tip interiorly into said second portion, said third opening having a width and a square shape of four sides leading to a third chamber, said third opening having a lesser width than said second opening;

said third chamber having a length and a fourth opening inwardly from said third opening, said fourth opening having a square shape of four sides leading to a fourth chamber and a width less than that of said third opening, said fourth chamber being recessed inwardly from said third chamber;

said third opening, said third chamber, said fourth opening, and said fourth chamber being coaxial upon said second portion;

said first opening, said first chamber, said second opening, and said second chamber being in mutual registration, and, said third opening, said third chamber, said fourth opening, and said fourth chamber being in mutual registration.

4. The valve key of claim 3 further comprising:

said first portion having a length at least three times that of its diameter and said second portion have a length at least three times that of its diameter.

5. The valve key of claim 3 further comprising:

a handle having a first end and an opposite second end, one of said first portion and said second portion connecting to said first end;

said first end of said handle having an opening therein and extending into said handle, said opening having at least one pocket;

one of said first portion of said shaft and said second portion of said shaft inserting into said opening of said first end and said knuckle inserting into said opening of said first end;

said knuckle including at least one detent and at least two minor detents, said at least one detent engaging said at least one pocket for securement of said knuckle to said handle; and, wherein said first portion and said second portion remain coaxial regardless of which inserts into said chamber.

6. A valve key comprising:

a shaft, said shaft having a first portion and a second portion, said second portion being coaxial with said first portion;

said first portion being cylindrical and elongated, having a diameter, a length and first tip;

said first tip having a first opening allowing access inwardly of said first tip interiorly into said first portion, said first opening having a width and a square shape of four sides leading to a first chamber;

said first chamber having a length and a second opening inwardly from said first opening, said second opening having a square shape of four sides leading to a second chamber and a width less than that of said first opening, said second chamber being recessed inwardly from said first chamber;

said first opening, said first chamber, said second opening, and said second chamber being coaxial upon said first portion;

said second portion being cylindrical and elongated, having a diameter less than that of said first portion, a length less than that of said first portion, and a second tip;

said second tip having a third opening allowing access inwardly of said second tip interiorly into said second portion, said third opening having a width and a square shape of four sides leading to a third chamber, said third opening having a lesser width than said second opening;

said third chamber having a length and a fourth opening inwardly from said third opening, said fourth opening having a square shape of four sides leading to a fourth chamber and a width less than that of said third opening, said fourth chamber being recessed inwardly from said third chamber;

said third opening, said third chamber, said fourth opening, and said fourth chamber being coaxial upon said second portion;

said first opening, said first chamber, said second opening, and said second chamber being in mutual registration, and said third opening, said third chamber, said fourth opening, and said fourth chamber being in mutual registration;

said first opening having each pair of adjacent sides approaching a corner and a rounded hole at each corner of said first opening, each of said rounded holes extending interiorly into said first portion along said first chamber, into said second opening, and along said second chamber, and each of said holes extending radially outwardly from said first opening;

said third opening having each pair of adjacent sides approaching a corner and a rounded hole at each corner of said third opening, each of said rounded holes extending interiorly into said second portion along said third chamber, into said fourth opening, and along said fourth chamber, and each of said holes extending radially outwardly from said first opening;

a knuckle, said knuckle transitioning said shaft from said first portion to said second portion wherein said knuckle reduces the diameter of said first portion to the diameter of said second portion;

a handle having a first end and an opposite second end, one of said first portion and said second portion connecting to said first end said first end of said handle having an opening therein and extending into said handle, said opening having at least one pocket;

one of said first portion of said shaft and said second portion of said shaft inserting into said opening of said first end and said knuckle inserting into said opening of said first end;

said knuckle including at least one detent and at least two minor detents, said at least one detent engaging said at least one pocket for securement of said knuckle to said handle;

wherein said first portion and said second portion remain coaxial regardless of which is inserted into said chamber; and, wherein said shaft is formed as a single piece.

* * * * *